(12) United States Patent
Kertesz

(10) Patent No.: US 6,540,868 B1
(45) Date of Patent: Apr. 1, 2003

(54) METHOD FOR PRODUCING A CONNECTOR

(75) Inventor: Janos Kertesz, Hofheim (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 09/579,192

(22) Filed: May 26, 2000

Related U.S. Application Data

(63) Continuation-in-part of application No. 09/384,068, filed on Aug. 26, 1999, now abandoned.

(30) Foreign Application Priority Data

Jun. 21, 1999 (DE) .......................................... 199 28 345
Nov. 9, 1999 (DE) .......................................... 199 53 746

(51) Int. Cl.⁷ ............................................. B29C 65/00
(52) U.S. Cl. ................ 156/304.2; 156/245; 156/308.2; 264/248
(58) Field of Search .............................. 156/245, 304.2, 156/304.6, 242, 309.3, 308.2; 264/248; 285/293.1, 141.1, 121.1, 22, 423, 18; 428/36.6; 137/587

(56) References Cited

U.S. PATENT DOCUMENTS

| | | | | |
|---|---|---|---|---|
| 4,619,470 A | * | 10/1986 | Overath et al. | 285/55 |
| 5,065,782 A | | 11/1991 | Szlaga | 137/39 |
| 5,258,213 A | * | 11/1993 | Mugge | 428/36.91 |
| 5,443,098 A | | 8/1995 | Kertesz | |
| 5,449,024 A | * | 9/1995 | Rober et al. | 138/137 |
| 5,605,175 A | | 2/1997 | Bergsma et al. | 137/202 |
| 5,618,599 A | | 4/1997 | Nulman et al. | 428/36.7 |
| 5,798,048 A | * | 8/1998 | Ries | 210/767 |
| 6,019,348 A | * | 2/2000 | Powell | 251/144 |
| 6,033,749 A | * | 3/2000 | Hata et al. | 428/36.7 |
| 6,189,567 B1 | * | 2/2001 | Foltz | 137/587 |
| 6,199,916 B1 | * | 3/2001 | Klinger et al. | 285/288.1 |

FOREIGN PATENT DOCUMENTS

| | | | |
|---|---|---|---|
| DE | 3621948 A1 | * 7/1988 | F16L/41/08 |
| DE | 42 39 909 C1 | 5/1994 | |
| DE | 195 35 413 C1 | 10/1996 | |
| DE | 195 48 188 A1 | 6/1997 | F16L/33/23 |
| DE | 196 17 349 C1 | 9/1997 | B29C/45/16 |
| DE | 199 12 438 A1 | 9/1999 | B65D/1/12 |

OTHER PUBLICATIONS

Patent Abstract of Japan Patent, Publication No. 61063426, Published Jan. 4, 1986.
Patent Abstract of Japan Patent, Publication No. 59023759, Published Jul. 2, 1984.

\* cited by examiner

*Primary Examiner*—Michael W. Ball
*Assistant Examiner*—Todd J. Kilkenny
(74) *Attorney, Agent, or Firm*—Darby & Darby

(57) ABSTRACT

A connector having at least three parts is used to connect a fluid line to an opening of a component that is made of a thermoplastic material. The connector is produced by forming a first part of the connector from an essentially thermoplastic material. A second part and a third part of the connector are produced from an essentially thermoplastic material so that the second part and the third part are fused together. The first part and the second part are connected in a fluid-tight manner outside of a mold. The material of the third part is selected so that it is capable of forming a fusion connection with the thermoplastic material of the component. The connector can also have at least one part. This connector is produced by injection molding a first outer part, an inner layer and an intermediate layer. The materials of the first outer part and the inner layer and the material of the intermediate layer are selected so that they have different properties with respect to their strength, impact resistance, and tendency to creep. At least one of the first outer part, the inner layer and the intermediate layer is formed so as to be impervious to diffusion.

27 Claims, 1 Drawing Sheet

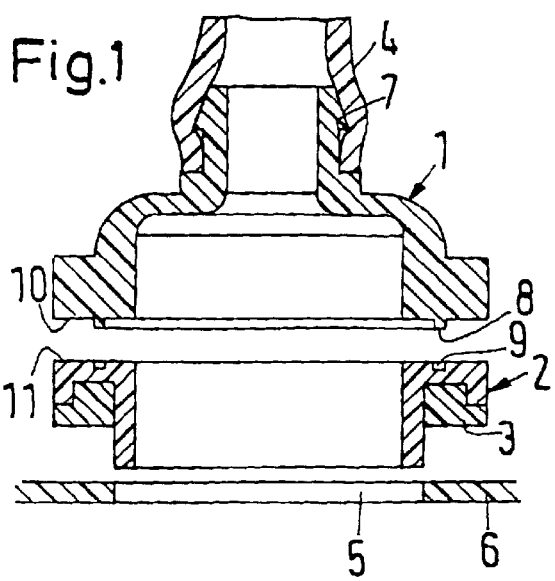
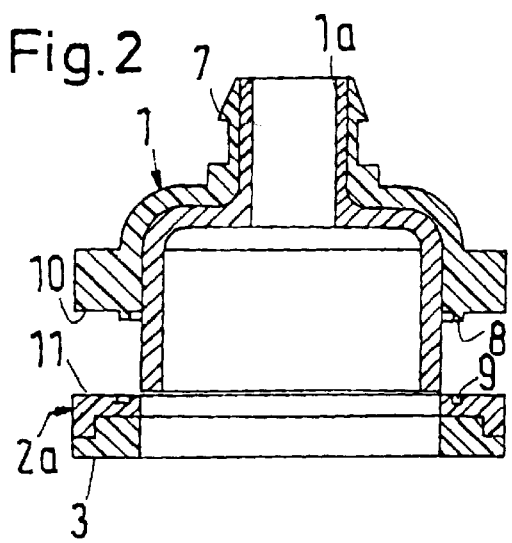
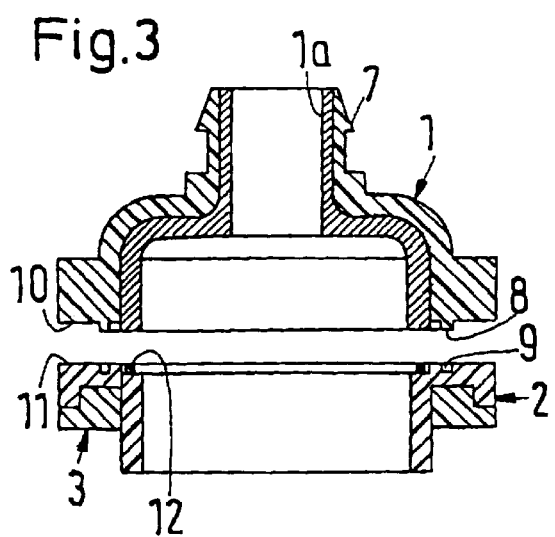
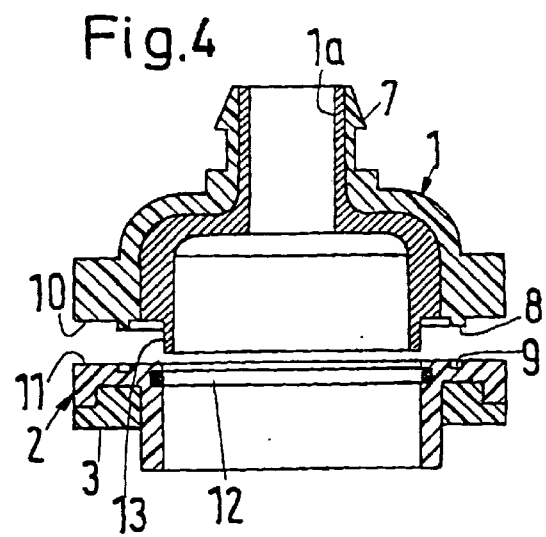
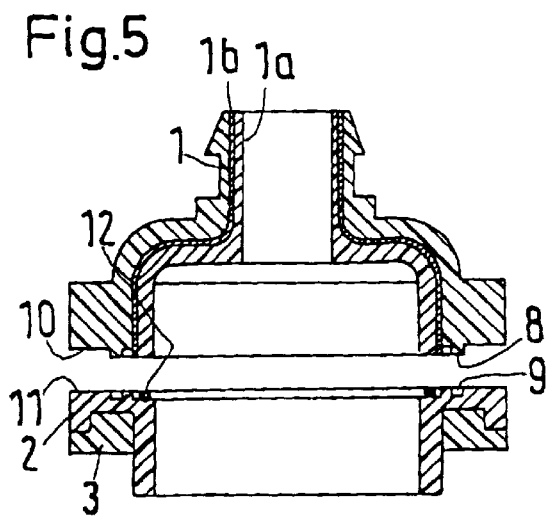
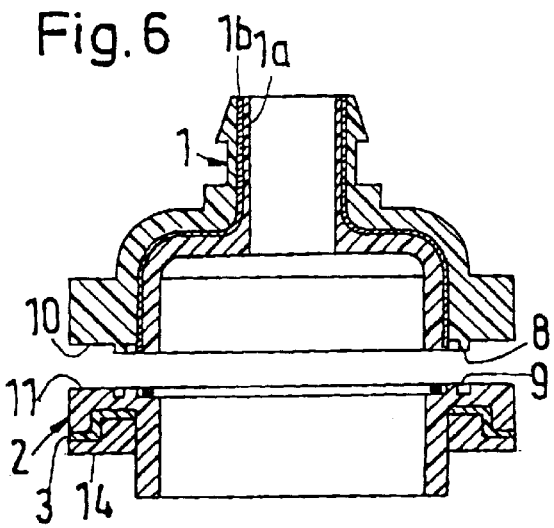

METHOD FOR PRODUCING A CONNECTOR

This is a continuation-in-part application of the U.S. Ser. No. 09/384,068 filed on Aug. 26, 1999, which is now abandoned.

BACKGROUND OF THE INVENTION

1. Field of the Invention

The present invention relates to a first type of method for producing a connector that is made from at least three parts. The connector connects a fluid line to an opening of a component that is made of a thermoplastic material. A first part of the connector is formed from an essentially thermoplastic material. A second part and a third part of the connector are each formed from an essentially thermoplastic material and are fused together so that they are connected in a fluid-tight manner. The material of the third part is selected so that it is capable of forming a fusion connection with the thermoplastic material of the component.

The present invention also relates to a second type of method for producing a connection that is made from an essentially thermoplastic material. The connector connects a fluid line to an opening of a component that is made of a thermoplastic material;

2. Discussion of the Related Art

German Reference Nos. DE 195 35 413 C1 and DE 42 39 909 C1, each discloses a process of the first type mentioned above in which the parts of a connector are produced by spraying or injecting a thermoplastic material onto, around or in the same mold to form a connected first and second part. The first part, to which the fluid line (e.g., a rubber hose or a flexible plastic line) is normally attached, can, according to the intended use, have any of a number of different shapes. For example, the first part, according to the use of the connector, can be a straight tube piece or bent at a large number of angles. In addition, the first part may have holding ribs, which also can be of various shapes and be present in various numbers. In contrast, the second and third parts always have the same form, independent of the form of the first part. Therefore, different molds must be produced according to the particular required form of the first part. But producing a different mold for the combined first and second parts of the connector is expensive.

German reference DE 195 46 188A1 discloses a process of the second type mentioned above in which the connector parts are produced as one part and are formed in one piece with the component. Because the parts of the connector are produced in one piece with the component, the structural requirements (e.g., strength, impact resistance, creep and diffusion) of the component are satisfied. But, during use, the connector may be exposed to higher loads, such as, for example, significant surface pressure when a fluid line is attached to the connector. Over time, especially if the connector is exposed to relatively higher temperatures, the parts of the connector can become permanently deformed. Also, producing the connector in one piece with the component requires the use of an expensive mold.

SUMMARY OF THE INVENTION

It is an object of the present invention to provide simplified processes for producing a connector.

This and other objects of the present invention are achieved in accordance with a first solution for a process of the first type by connecting the first part and the second part of the connector outside of a mold.

In accordance with a presently preferred exemplary embodiment of the present invention, the first part is produced in its own mold and the second and third parts together are produced in their own mold. To produce the various required shapes of the first part, only the first part mold has to be separately produced to correspond to the various shapes. In contrast, the mold that is used jointly for the second and third parts, remains unchanged and, therefore, only has to be produced in one shape. Thus, the overall cost for producing a connector with the molds in accordance with the present invention is significantly reduced.

The first and second parts may be bonded, for example by fusion. The fusion connection can be made by hot plate welding (also called "butt-fusion using hot plate welding"), ultrasonic welding, or rotation welding (i.e., friction welding).

Alternatively, the first and second parts can be connected in a form-locking (or form-closing) manner such as, for example, by a snap, bayonet, or threaded connection.

To simplify the production of fusion connections and form-locking connections, a surface of the first part and a surface of the second part that are to be connected may be shaped before being connected so that they will mesh with each other.

To render the connection between the first and second parts as impervious as possible, a seal may be placed in a plane between the surfaces of the first and second parts that are to be connected.

The second part may be formed so as to extend through the third part beyond the side of the third part, which side faces the component. The second part can then be introduced into the opening in the component to center the connector with respect to the opening. The material that the second part is made from can be chosen to protect the connector against corrosion and/or diffusion of the fluid (e.g. fuel or oil for a combustion engine) fed through the connector.

At least one of the second part and the third part may be formed so as to be impervious to diffusion.

The first part is, in one embodiment, produced with at least one layer provided thereon. The first part and the at least one layer may be made of materials having different properties with respect to their strength, impact resistance, and tendency to creep. Thus, there is a relatively wide range of selection for the thermoplastic material of the first part. For example, the first part material can be selected so that it can be fused, in a relatively simple manner, to the material of the second part. The first and second parts can be made from the same material. In contrast, the material of the at least one layer should meet a large number of requirements for the combination of the at lease one layer and the first part, such as, for example, strength, impact resistance, tendency to creep and sealing against diffusion. Thus, the first part is, in one embodiment, produced with at least one metal layer because metal provides high sealing effectiveness against diffusion.

In an alternative embodiment, the at least one layer can be made of plastic, and at least one of the first part and the at least one layer is reinforced.

The at least one layer may be formed on the inner side of the first part and extend over the axial length of the inner side of the second and third parts on the inner side of the second part. Thus, with an appropriate selection of the material of the at least one layer, the second and third parts are protected by the at least one layer.

The second and third parts may be formed by injection-molding in a common mold and are formed to be rotationally symmetrical. Because the part to be formed is rotationally symmetrical, the formation of the mold is simplified.

The first part and the at least one layer are preferably formed by a multi-component injection or a sandwich-injection molding process. Thus, a relatively simple mold can be used to produce the first part and the at least one layer.

A fourth part is, in one embodiment, fused onto the third part, on the side of the third part facing away from the second part. The fourth part may be made of a thermoplastic material that is capable of forming a fusion connection with the component. The fourth part may have a higher resistance to tension cracks than the third part. Because the component to which the connector will be fused is typically made of a plastic that has a high resistance to cracking, making the fourth part of a higher resistance material ensures that if a higher tension load is applied on the component, the fusion connection between the connector and the component will not be broken nor will a tension crack be created in the connector.

The material of the fourth part preferably has a higher density and viscosity than the density and viscosity properties of the material of the third part.

In accordance with a second solution for a process of the second type, the object of the present invention, and other objects, are achieved by making the connector from an outer part, an inner layer and an intermediate layer in an injection-molding process. The outer part and the inner layer, on the one hand, and the intermediate layer, on the other, are made of materials with different properties, especially with respect to strength, impact resistance, and tendency to creep. At least one of the outer part, the inner layer and the intermediate layer is formed so as to be impervious to diffusion. Thus, in accordance with this solution, a connector having a complex shape can be produced in a simple manner, whereby the materials of the outer part and the layer(s) on the inner side of the outer part are selected so that the connector meets all structural requirements of the connector. The injection-molding process is preferably a sandwich, monosandwich, push-pull, or coinjection injection process. Another intermediate layer may be disposed between the first outer part and the inner layer. The intermediate layer is preferably a coupling agent.

BRIEF DESCRIPTION OF THE DRAWING FIGURES

The above and still further objects, features and advantages of the present invention will become apparent upon consideration of the following detailed description of specific embodiments thereof, especially when taken in conjunction with the accompanying drawings wherein like reference numerals in the various FIGS. are utilized to designate like components, and wherein:

FIG. 1 is an axial cross-sectional view of a first embodiment of a connector according to the present invention;

FIG. 2 is an axial cross-sectional view of a second embodiment of a connector according to the present invention;

FIG. 3 is an axial cross-sectional view of a third embodiment of a connector according to the present invention;

FIG. 4 is an axial cross-sectional view of a fourth embodiment of a connector according to the present invention.

FIG. 5 is an axial cross-sectional view of a fifth embodiment of a connector according to the present invention; and FIG. 6 is an axial cross-sectional view of a sixth embodiment of a connector according to the present invention.

DETAILED DESCRIPTION OF THE PREFERRED EMBODIMENT

Referring now to FIG. 1, a connector is illustrated. The connector is comprised of three different parts 1, 2 and 3. The connector tightly connects a fluid line 4 with an opening 5 of a component 6. Component 6 is made essentially of a thermoplastic material. Component 6 may be, for example, a fuel tank for a vehicle.

Part 1 is made essentially of a thermoplastic material. Part 1 is formed in a first mold by an injection-molding process. Likewise, parts 2 and 3 are made essentially of a thermoplastic material, and are formed in a separate second mold by an injection-molding process. Thus, parts 2 and 3 are simultaneously fused together. The thermoplastic material of parts 2 and 3 are, therefore, selected so that they can be fused together. The material of part 3 is also selected so that it can be fused with the thermoplastic material of component 6, which is comprised of mainly HDPE.

The material of part 2 can be selected, for example, from the group of materials PA, PBT, PBN, POM, PPS, aliphatic polyketone, PVDF, PE, or PP. The material of part 3 can be selected from the group of materials PBT, PBN, POM, PPS, aliphatic polyketone, PVDF, and PE. Therefore, the material of part 3 can be selected, for example, from the group of materials HDPE, PP, TEEE, PA, and TPE. The materials of parts 2 and 3 can each be non-reinforced or reinforced with fibers, such as, for example, glass fibers, carbon fibers, or metal fibers.

The plastic material of part 1 can be made from the same or different material as that of part 2. If parts 1 and 2 are made from different materials, the materials are selected so that they can be fused together and/or connected to each other in a form-locking manner.

Part 1 is typically required to have, at least in its section facing away from part 2, a large number of different shapes For example, the portion of part 1 that is to be connected to fluid line 4 can be straight, as shown in FIGS. 1–6, or bent, for example, at a 90° angle. This portion of part 1 can have various lengths, thicknesses, and any number of holding ribs for fluid line 4. In the illustrated examples, this portion of part 1 has only one holding rib 7.

Parts 2 and 3, in contrast, should have, as a general rule, only one shape, which is rotationally symmetrical, as shown in FIG. 1.

To form parts 1, 2, and 3, only the mold for part 1 needs to be shaped differently. To form parts 2 and 3, the same shape mold can always be used, in which parts 2 and 3 are fused together at their boundary surfaces by fusion.

After part 1 and the ring consisting of parts 2 and 3 are produced, parts 1 and 2 are preferably fused together, for example, by hot plate welding, ultrasonic welding, or rotation welding (i.e., friction welding). A shape 8, which is preferably in the form of a plurality of projecting ring-shaped ribs, is brought into contact with a surface 10 of part 1 that is to be fused with part 2. Part 2 has a shape 9 in its surface 11 that is complementary to shape 8. Shape 9 is preferably in the form of a ring groove. Thus, a type of labyrinth seal results in the region of surfaces 10 and 11 of parts 1 and 2, respectively, that are to be fused together.

The thermoplastic material of part 11 can be reinforced with fibers, such as, for example, glass fibers, carbon fibers or metal fibers. One or both of parts 2 and 3 can also be reinforced with fibers. Parts 1 and 2 should be sealed against diffusion. Part 3 should have a relatively higher strength, impact resistance and/or electrical conductivity than parts 1 and 2.

If the two parts 1 and 2 are not fused, but are only connected in a form-locking manner, for example, by means of a snap connection, a threaded connection, or a bayonet connection, their respective plastic materials do not have to be fusible with respect to each other. In other words, parts 1 and 2 would not have to be made from the same or even compatible materials with respect to their ability to be fused.

Referring now to FIG. 2, a second embodiment of a connector according to the present invention is illustrated. The connector of FIG. 2 differs from that of FIG. 1 in that part 1 has a somewhat thinner wall than part 1 of FIG. 1. Part 1 of the second embodiment is coated with an additional layer 1*a*. Part 2*a* has no inner wall continuing through part 3 as does part 2 of the first embodiment. Instead of this inner wall, layer 1*a* extends sufficiently far enough from the side of part 1 that faces toward part 2*a* so that when parts 1 and 2*a* are connected, the extending portion of layer 1*a* protrudes through parts 2*a* and 3 at least as far as the opening 5 of component 6. Layer 1*a*, therefore, covers the radially internal side of parts 2*a* and 3. In this case, first part 1 and layer 1*a* can be produced from different materials that have different properties, especially with respect to their strength, impact resistance, and tendency to creep. For example, at least one of the first part 1 and/or layer 1*a* are formed so as to be sealed against diffusion so that the fluid fed through the connector, such as, for example, gasoline or Diesel fuel, cannot diffuse through the connector to the outside. If layer 1*a* has a correspondingly high strength, high impact resistance, and low tendency to creep, as well as a high sealing effect against diffusion, then a wider range of materials are available for the selection of the materials of part 1, 2*a*, and 3. Of course, it must still be possible to fuse part 2*a* with part 1 and part 3, and to fuse part 3 with component 6. But if parts 1 and 2*a* are connected in a form-locking manner these parts do not have to be made of materials that are compatible with respect to fusibility. Thus, an especially suitable material for layer 1*a* would be a metal that not only seals against diffusion of the fluid to be fed through it, but also is corrosion-resistant.

Layer 1*a* can, however, also be made of a plastic material that at least partially meets the requirements established for connectors for strength, impact resistance, tendency to creep and sealing against diffusion, to the extent that these requirements are not met by parts 1 and 2*a*. Thus, the plastic material of layer 1*a* can be reinforced with fibers.

As in the first embodiment, parts 1 and 1*a* of this second embodiment are typically required to have a large number of different shapes. The process for producing the parts is basically the same as in the first embodiment. More specifically, parts 2*a* and 3 are injected into a common mold and are thereby fused together. If part 1 and layer 1*a* are made of thermoplastic materials, they can be produced together in a second mold by a multi-component injection-molding process. In contrast, if layer 1*a* is made of metal, layer 1*a* is formed first and then the material of part 1 is injected around layer 1*a* in the same mold.

Therefore, even in accordance with this second embodiment, only one mold of a particular shape is needed to form the rings consisting of parts 2*a* and 3, independent of the large number of different shapes of parts 1 and layer 1*a*. Thus, only part 1 and layer 1*a* have to be produced with differently shaped molds according to their various shapes.

Referring now to FIG. 3, a third embodiment of a connector according to the present invention is illustrated. The connector of FIG. 3 differs from that of FIG. 1 essentially only in that part 1 is provided with an inner layer 1*a*, which in this case does not extend through parts 2 and 3, but is approximately flush at its lower end with the lower surface of projecting rib 8. Additionally, part 2 has a recess on its radially inner wall, in which a seal 12, which is preferably in the shape of an O-ring, is placed. Seal 12 is preferably made of a material that is impervious to diffusion. The lower axial end surface of layer 1*a* faces toward seal 12. Thus, after parts 1 and 2 are connected (e.g., after a fusion or a form-locking connection has been effected), seal 12 aids in sealing this connection and may be sufficient by itself to seal the connection.

The selection of materials and the manner of forming parts 1, 2, and 3, and layer 1*a* for this third embodiment is the same as described above for the second embodiment.

A fourth embodiment of a connector in accordance with the present invention is illustrated in FIG. 4. This fourth embodiment connector differs from that of the third embodiment (i.e., FIG. 3) in that seal 12 is placed in a ring groove disposed in the radially inner side of part 2. Layer 1*a* is provided on its lower end with an apron-like extension 13, which protrudes into part 2 in the assembled state of the connector. In the assemble position, apron-like extension 13 presses against seal 12 to provide an additional seal for the connection of parts 1 and 2.

A fifth embodiment of a connector in accordance with the present invention is illustrated in FIG. 5. This fifth embodiment connector differs from the third embodiment in that another layer 1*b* is placed between part 1 and inner layer 1*a*. Part 1 and layer 1*a* are preferably made of essentially thermoplastic materials and middle layer 1*b* is preferably made of metal. It is also possible, however, that inner layer 1*a* can be made of metal as well.

Alternatively, layers 1*a* and 1*b* can both be made of essentially thermoplastic materials that satisfy the established requirements, to the extent that they are not fulfilled by the material of part 1.

If part 1 and layers 1*a* and 1*b* are made from essentially thermoplastic materials, they can be produced in one mold by a multi-component, sandwich, monosandwich, coinjection, or a push-pull injection-molding process. In the sandwich or monosandwich injection-molding process, part 1 and layer 1*a* would preferably be made from the same material. In some cases, part 1 and layers 1*a* and 1*b* can also be made from different materials, which, in the assembled position, together would meet all requirements set with respect to strength, impact resistance, and tendency to creep, as well as sealing against diffusion.

In this fifth embodiment, therefore, the portion of the connector that includes part 1 and layers 1*a* and 1*b* and the portion of the connector that includes ring parts 2 and 3 can each be formed in their own molds. These portions are then connected together outside of the molds. Thus, these portions can be connected, for example, by fusion or form-locking manner.

A sixth embodiment of a connector according to the present invention is illustrated in FIG. 6. The connector according to the sixth embodiment differs from the one according to the fifth embodiment in that the third part 3 is somewhat thinner. Additionally, a fourth part 14 is fused to the third part on the side of third part 3 that faces away from part 2. Part 14 is made of a thermoplastic material that is capable of forming a fusion connection with component 6 and has a higher resistance to cracking than the material of third part 3. The thermoplastic material of the fourth part 14 preferably has a higher density and viscosity than that of the material of the third part 3. But fourth part 14 can be made from the same material as that of third part 3. Also, parts 3 and 14 can be connected in a form-locking manner.

Fourth part 14 can be included in any of the first five embodiments. Part 14 is preferably injected together with parts 2, 2a, and 3 in a common mold.

But it is also possible, in the embodiment examples according to FIGS. 5 and 6, to omit parts 2, 3 and 14, seal 12 and rib 8. In this case, only outer part 1 and the layers 1a, 1b of the connector are made of essentially the same thermoplastic material. This connector can be made, in a variety of shapes, in a simple manner by injection molding, preferably by the sandwich, monosandwich, push-pull, or coinjection injection-molding process. Outer part 1 and layers 1a, 1b are made from materials with different properties, especially in regard to their strength, impact resistance, and tendency to creep. At least one of the outer part 1 and layers 1a, 1b is impervious to diffusion.

In all exemplary embodiments, the connector is made of various parts and/or various materials and is diffusion-safe and crash-safe for connecting a fluid line to component 6, which preferably is a vehicle fuel container. Part 1 and the inner layers 1a and 1b, which may optionally be provided, are, at least in their section that is to be connected to fuel line 4, essentially the same in all embodiments, especially with respect to being rotationally symmetrical. Likewise, in the embodiments of the connector being formed from multiple parts in accordance with the first type of method, parts 2, 2a, 3, and 14 can be essentially the same in all embodiments, especially with respect to being rotationally symmetrical. Thus, the present invention connector achieves a significant cost decrease with respect to conventional processes for producing a connector in which all parts are formed simultaneously in a mold and a separate mold has to be constructed for all the various shapes of part 1.

Having described the presently preferred exemplary embodiment method for producing a connector in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A method for producing a connector of at least three parts to connect a fluid line to an opening of a component that is made essentially of a thermoplastic material, the method comprising the steps of:

forming a first part of the connector from an essentially thermoplastic material;

forming a second part from an essentially thermoplastic material and comprising a second part boundary surface;

forming a third part from an essentially thermoplastic material and comprising a third part boundary surface;

fusing the second part boundary surface and the third part boundary surface together;

connecting the first part and the second part in a fluid-tight manner outside of a mold; and selecting the material of the third part so that it is capable of forming a fusion connection with the thermoplastic material of the component.

2. A method according to claim 1, wherein in the connecting step, the first and second parts are materially bonded.

3. A method according to claim 2, wherein in the connecting step, the first and second parts are fused together.

4. A method according to claim 1, wherein in the connecting step, the first and second parts are connected in form-locking manner.

5. A method according to claim 1, further comprising the step of:

shaping a surface of the first part and a surface of the second part to be connected before the connecting step so that the surfaces mesh with each other.

6. A method according to claim 5, further comprising the step of:

placing a seal in a plane between the surfaces of the first and second parts that are to be connected.

7. A method according to claim 1, wherein in the forming a second part and a third part step, the second part is formed so as to extend through the third part beyond the side facing the component.

8. A method according to claim 1, wherein in at least one of the forming steps, at least one of the second part and the third part is formed so as to be impervious to diffusion.

9. A method according to claim 1, further comprising the step of:

providing the first part with at least one layer, the first part and the at least one layer being made of materials having different properties with respect to their strength, impact resistance, and tendency to creep, whereby at least one of the first part and the at least one layer is formed so as to be impervious to diffusion.

10. A method according to claim 1, further comprising the step of providing the first part with at least one layer that is made of metal.

11. A method according to claim 9, wherein the at least one layer is made of plastic, and at least one of the first part and the at least one layer are reinforced.

12. A method according to claim 9, wherein in the providing step, the at least one layer is formed on the inner side of the first part and extends over the axial length of the inner side of the second and third parts on the inner side of the second part.

13. A method according to claim 10, wherein in the providing step, the at least one layer is formed on the inner side of the first part and extends over the axial length of the inner side of the second and third parts on the inner side of the second part.

14. A method according to claim 1, wherein in the forming a second part and a third part step, the second and third parts are injected in a common mold and are formed to be rotationally symmetrical.

15. A method according to claim 9, further comprising the step of:

forming the first part and the at least one layer by a sandwich injection-molding process.

16. A method according to claim 1, further comprising the step of:

fusing a fourth part onto the third part on a side of the third part facing away from the second part, the fourth part being made of a thermoplastic material that is capable of forming a fusion connection with the component, and the fourth part having a higher resistance to tension cracks than the third part.

17. A method according to claim 16, wherein the fourth part has a higher density and viscosity than the density and viscosity of the third party.

18. A method according to claim 1, further comprising the steps of:

injection molding the first part with an inner layer and an intermediate layer;

selecting the materials of the first part and the inner layer and the material of the intermediate layer so that they have different properties with respect to their strength, impact resistance, and tendency to creep, whereby at least one of the first part, the inner layer and the intermediate layer is formed so as to be impervious to diffusion.

19. A method according to claim 18, wherein in the injection molding step, the first part, inner layer and intermediate layer are formed by a sandwich injection molding process.

20. A method according to claim 18, wherein in the injection molding step, the first part, inner layer and intermediate layer are formed by a monosandwich injection molding process.

21. A method according to claim 18, wherein in the injection molding step, the first part, inner layer and intermediate layer are formed by a push-pull injection molding process.

22. A method according to claim 18, wherein in the injection molding step, the first part, inner layer and intermediate layer are formed by a coinjection injection molding process.

23. A method according to claim 18, wherein the intermediate layer is a coupling agent.

24. A method according to claim 19, further comprising the step of placing an intermediate coupling agent layer between the first part and the inner layer.

25. A method according to claim 20, further comprising the step of placing an intermediate coupling agent layer between the first part and the inner layer.

26. A method according to claim 21, further comprising the step of placing an intermediate coupling agent layer between the first part and the inner layer.

27. A method according to claim 22, further comprising the step of placing an intermediate coupling agent layer between the first part and the inner layer.

* * * * *